US006998146B2

(12) United States Patent
Murphy et al.

(10) Patent No.: US 6,998,146 B2
(45) Date of Patent: *Feb. 14, 2006

(54) FOOD PRODUCTS AND THEIR METHOD OF PREPARATION

(75) Inventors: Maeve Murphy, Plymouth, MN (US); James E. McGuire, Crystal, MN (US); Duane C. Wosje, Golden Valley, MN (US); James E Langler, White Bear Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 197 days.

This patent is subject to a terminal disclaimer.

(21) Appl. No.: 09/952,362

(22) Filed: Sep. 11, 2001

(65) Prior Publication Data

US 2003/0054086 A1     Mar. 20, 2003

(51) Int. Cl.
*A23L 1/00*     (2006.01)

(52) U.S. Cl. .................. 426/654; 426/521; 426/564

(58) Field of Classification Search ............... 426/520, 426/521, 564, 570, 571, 572, 654
See application file for complete search history.

(56) References Cited

U.S. PATENT DOCUMENTS

| | | | |
|---|---|---|---|
| 3,671,459 A | | 6/1972 | Norris |
| 4,273,790 A | | 6/1981 | Bosco et al. |
| 4,424,237 A | * | 1/1984 | Wittman, III ............... 426/653 |
| 4,468,408 A | | 8/1984 | Bosco et al. |
| 4,888,194 A | * | 12/1989 | Andersen et al. ........... 426/570 |
| 6,117,473 A | | 9/2000 | Leshik et al. |
| 6,242,020 B1 | | 6/2001 | Jacobson et al. |

FOREIGN PATENT DOCUMENTS

| | | |
|---|---|---|
| DE | 2437574 A | 2/1976 |
| EP | 0 188 318 | 1/1986 |
| EP | 0 479 288 A2 | 10/1991 |
| GB | 2 351 430 A | 1/2001 |
| JP | 59025640 A | 2/1984 |
| JP | 5076321 A | 3/1993 |
| JP | 7265023 A | 10/1995 |
| JP | 3061214 B2 | 7/2000 |
| WO | WO 81/00061 | 1/1981 |
| WO | WO 99/25207 | 5/1999 |

* cited by examiner

*Primary Examiner*—Leslie Wong
(74) *Attorney, Agent, or Firm*—Annette M. Frawley

(57) ABSTRACT

The present invention provides methods for preparing at least pasteurized hydrated emulsifier compositions. The methods for preparing an aseptic hydrated emulsifier comprise the steps of: A. Preparing a hydrated emulsifier blend of lactylated mono- and di-glycerides; B. Treating the hydrated blend to at least pasteurize the blend to form an at least pasteurized hydrated emulsifier blend; and, C. Cooling the at least pasteurized hydrated emulsified blend to refrigerator temperatures forming a cooled pasteurized hydrated emulsifier blend.

In preferred embodiments, the present methods comprise substeps for preparing the hydrated emulsifier blend of lactylated mono- and di-glycerides, comprising: admixing a first wetting agent emulsifier comprising sodium stearyl lactate with hot water to form a clear mixture; admixing a second emulsifier comprising a blend of lactylated mono- and di-glycerides with the clear mixture; and, maintaining the lactic ester blend of mono- and di-glycerides at about 43° C. to 95° C. for sufficient time to disperse and hydrate the lactylated mono- and di-glyceride in the clear mixture to form a hydrated emulsifier blend. The hydrated emulsifier described herein is also useful in the aeration of food products such as yogurt, other refrigerated milk products, ready-to-spread frostings, fermented and unfermented soy, rice and nut milk products, beverages, and whipped toppings.

18 Claims, No Drawings

FOOD PRODUCTS AND THEIR METHOD OF PREPARATION

FIELD OF THE INVENTION

The present invention relates to food products and to their methods of preparation. More particularly, the present invention provides novel compositions that are hydrated emulsifiers useful in the preparation of food products, especially aerated yogurt products.

BACKGROUND OF THE INVENTION

The present invention provides novel compositions comprising aseptic hydrated emulsifiers useful for post fermentation addition to dairy products especially cultured dairy products such as stirred style yogurt. The hydrated emulsifiers are useful in the preparation of a structurally stable aerated refrigerated food product, more specifically a structurally stable aerated dairy product with visual aircells.

Refrigerated cultured dairy products especially stirred style yogurt products having live or active yogurt cultures are well known. Such yogurt products can be aerated to provide "whipped" yogurt products desirably characterized by a light airy, or fluffy texture. However, such aerated yogurt products are subject to destabilization over their shelf lives. In particular, aerated yogurt products are subject to changes or degradation in aerated texture due to changes in the foam structure of the aerated structure making it difficult to retain an airy, fluffy texture of the aerated yogurt product over time.

Ingredients can be added to a milk blend from which yogurt is cultured that affect the finished product's attributes such as texture and/or aeration. However, such added ingredients in the milk blend can adversely affect important preparation considerations such as fermentation times. Some added ingredients can adversely inhibit culture growth thereby undesirably lengthening fermentation times.

The present invention provides hydrated emulsifiers that are usefully added to already cultured dairy products. Since the hydrated emulsifiers are added post fermentation, such addition does not adversely lengthen fermentation times. However, for such post fermentation addition, the added ingredients must be aseptic since the cultured dairy products will receive no further heat processing.

Interfaces are a pervasive feature of foods. Three specific kinds of interfaces are of particular importance in foods: liquid-liquid, or emulsions; air-liquid, or foams; and solid-liquid, or dispersions. Controlling the physical nature of an interface is crucial in making a high-quality food product and is frequently achieved by including emulsifiers among the ingredients. The present invention provides a method and a novel hydrated emulsifier composition particularly useful in the air-liquid interface, specifically food foams such as for example an aerated yogurt product.

Food foams are usually made by whipping an aqueous solution of a foaming agent such as a protein or an emulsifier in a food product base. Air is first entrained by the action of a mechanical element and then air bubbles are elongated and subdivided into smaller bubbles as a result of the protein or emulsifier. Air is a nonpolar medium. Emulsifiers concentrate at the air-water interface, and the hydrophobic portion extends into the gas phase.

Although emulsifiers useful in the air-liquid interface are well known, it will be appreciated that an emulsifier blend capable of assisting in the creation of a structurally stable, texturally appealing aerated cultured dairy product such as an aerated yogurt has not been easily ascertained. Surprisingly, although one of the ingredients selected for the emulsifier blend is known to enhance the destabilization and agglomeration of fat globules thereby promoting the formation of stable foam in ice cream, dairy and recombined creams, and rehydrated toppings, it was not previously known to enhance the stability of the air hydrophobic phase. The air hydrophobic phase is a critical phase for the development of a stable aerated yogurt product. The present selected emulsifier blends are surprisingly useful in providing aerated refrigerated cultured dairy products.

Not only are the organoleptic attributes of the aerated dairy products surprisingly pleasing but also these pleasing eating characteristics and the foam properties are maintained over the shelf lives of the aerated products.

In its method aspect, the present invention described herein comprises methods for preparing improved hydrated aseptic emulsifier compositions, such that the improved hydrated emulsifier is useful in creating a texturally appealing, structurally stable aerated dairy product, such as aerated yogurt.

SUMMARY OF THE INVENTION

The present invention provides methods for preparing at least pasteurized hydrated emulsifier compositions. In the preferred embodiment, the methods for preparing an aseptic hydrated emulsifier comprise the steps of: A. Preparing a hydrated emulsifier blend of lactylated mono- and di-glycerides; B. Treating the hydrated blend to at least pasteurize the blend to form an at least pasteurized hydrated emulsifier blend; and, C. Cooling the at least pasteurized hydrated emulsified blend to refrigerator temperatures forming a cooled pasteurized hydrated emulsifier blend.

In preferred embodiments, the present methods comprise substeps for preparing the hydrated emulsifier blend of lactylated mono- and di-glycerides, comprising: admixing a first wetting agent emulsifier comprising sodium stearyl lactate with hot water to form a clear mixture; admixing a second emulsifier comprising a blend of lactylated mono- and di-glycerides with the clear mixture; and, maintaining the lactic ester blend of mono- and di-glycerides at about 43° C. to 95° C. (about 110° F. to 200° F.) for sufficient time to disperse and hydrate the lactylated mono- and di-glyceride in the clear mixture to form a hydrated emulsifier blend.

The hydrated emulsifier compositions so prepared are useful in the formulation and post fermentation preparation of aerated chilled yogurt products. The hydrated emulsifier when added to the cultured yogurt provides desirable sensory attributes, and emulsion and aeration/foam stability. The hydrated emulsifier also affects the process mixing, thermal processing, fermentation rates, and shear and aeration tolerances.

In its product aspect of one and the same invention, the present invention provides a food product that is an aqueous dispersion of a blend of hydrated emulsifiers useful as an intermediate product in the method of preparing an aerated chilled yogurt product. In one variation, the food product is prepared by practicing the present hydrated emulsion methods of preparation. The aqueous dispersion comprises;

About 0.5% to 1.5% of the aqueous dispersion of sodium stearyl lactylate;

About 5% to 15% of the aqueous dispersion of hydrated lactylated mono- and di-glycerides; and, The balance water.

The hydrated emulsion blend is at least pasteurized.

The hydrated emulsifier described herein is also useful in the aeration of other food products such as ready-to-spread frostings, other refrigerated milk products, fermented and unfermented soy, rice and nut milk products, beverages, and whipped toppings.

DETAILED DESCRIPTION OF THE INVENTION

The present invention relates to methods for preparing an aseptic hydrated emulsifier and compositions of the hydrated emulsifier blend especially useful in food products, more particularly useful in aerated dairy products. The product components as well as methods of preparation, product use and attributes are described in detail below.

Throughout the specification and claims, percentages are by weight and temperatures in degrees Celsius, unless otherwise indicated.

The present invention can, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced herein.

Various terms used throughout the description are defined first, followed by a discussion of the preferred embodiment, including information on the composition. The process for making the hydrated emulsifier is described next, followed by a brief conclusion highlighting some of the advantages of the embodiment of the invention.

Introductory Definitions

As used herein, the term "hot water" means water having a temperature above the melting point of the wetting agent, sodium stearyl lactylate. Good results for the embodiment described herein are obtained with hot water having a temperature ranging from about 65° C. to 85° C. (about 150° F. to 180° F.).

The phrase "gentle agitation" refers to mixing in the range of 5 RPM to 20 RPM, preferably about 10 RPM. A variety of equipment well known in the art can be used to achieve the agitation.

The term "wetting agent" means agents that promote the spreading of a liquid on a solid surface.

The term "emulsifier" means a surfactant that promotes the formation of an emulsion.

The term "krafft point" means temperature at which the solubility of micelle-forming surfactants or emulsifiers reach the critical micelle concentration. Emulsifiers or surfactant solutions above the critical micelle concentration can solubilize otherwise insoluble organic material by incorporating it into the interior of the micelles.

The term alpha-gel phase refers to an hydrated emulsifier with a temperature below the "krafft point".

"High viscosity" means greater than 40,000 cps.

"Low viscosity" means less than 20,000 cps.

The present methods for preparing a hydrated emulsifier generally comprise preblending a wetting agent in hot water, adding a lactylated mono- and di-glyceride blend, and hydrating the emulsifier blend.

The present methods comprise a first essential step of preparing a at least pasteurized hydrated emulsifier composition. In preferred embodiments, this first essential step can involve a first sub-step of 1. adding a first emulsifier or wetting agent to hot water to form a clear mixture. The wetting agent facilitates dispersion of the lactylated emulsifiers in the water to form the hydrated emulsifier composition. The wetting agent is selected from the group consisting of polysorbates, propylene glycol esters, sodium dodecyl sulphate, sodium stearyl lactylate and mixtures therein. Most preferred for use herein due to its high solubility and ionic nature is sodium stearyl lactylate.

The amount of wetting agent added to the composition has a direct effect on the viscosity of the hydrated emulsifier. Since the hydrated emulsifier will be added at refrigerated temperatures (generally about 1° C. to 7° C.) to the refrigerated yogurt for ease of handling and mixing without imparting shear to the yogurt, the hydrated emulsifier composition is desirably characterized by a thin texture, i.e., a low viscosity. Good results are obtained with low viscosity hydrated emulsifier compositions having viscosities ranging from about 5,000 to 40,000 cps, preferably ranging from about 10,000 to 25,000 cps at temperatures when added to the cultured dairy products. Generally, compositions comprising about 0.5% to about 1.5% wetting agent(s) provide hydrated emulsifier compositions having viscosities within the desired ranges at refrigerator temperatures. Hydrated compositions comprising about 0.75% to about 1.25% of the first emulsifier or wetting agent are preferred for use herein.

It is desirable to have the hot water at a temperature such that it is at least above the melting point of the wetting agent, in order to aid the dispersion or solution of the wetting agent in the water. In more preferred embodiments, the hot water ranges from about 40° C. to 95° C.

When hot water is used, the dispersion or solution of the wetting agent can be easily practiced with mild agitation for brief periods, e.g., a few seconds up to a few minutes to provide a thoroughly intermixed blend.

The first essential step of preparing an at least pasturized hydrated emulsifier composition can further comprise a second sub-step of adding a second emulsifier ingredient that is an emulsifier blend of lactylated mono- and di-glycerides to the thoroughly intermixed wetting agent and hot water. The lactylated blend of mono- and di-glycerides is selected from the group consisting of lactylated mono- and di-glycerides, citrate acid esters of mono- and di-glycerides, and distilled monoglyerides. It should be noted that gentle agitation can be beneficially maintained throughout the preparation of the hydrated emulsifier.

The lactylated emulsifier blend is fairly hydrophobic and does not disperse readily in water. If the emulsifier blend is added into water prior to the wetting agent, then the emulsifier blend can clump and can fail by exhibiting difficulty in completely hydrating. The order of addition of the hydrate make-up is optional, however the second emulsifier blend becomes beneficially more hydrated with a first addition of the wetting agent. While not wishing to be bound by the proposed theory, it is speculated herein that the wetting agent works to coat the more hydrophobic portions of the second emulsifier blend and open up the structure allowing the surface to become wetted and the second emulsifier blend hydrated upon addition to the clear mixture.

The hydrated emulsifier blend can comprise about 5% to about 15% of the second emulsifier blend. Better results are obtained when the second emulsifier blend is present in the hydrated emulsifier in concentrations ranging from about 8% to 12% and for best results about 10%.

The second emulsifier is a lactylated blend of mono- and di-glycerides. The target iodine value of the second emulsifier is less than or equal to 5. The iodine value of the second emulsifier is a consideration in selection, if the iodine value is greater than 5, then the second emulsifier becomes more difficult to hydrate. The ease of hydrating the second emulsifier increases with the saturation level indicated a lower iodine value. Such a selected emulsifier is surprisingly effective in providing an aerated fermented airy, fluffy product with desirable taste, organoleptic properties and foam stability. Such lactylated mono- and di-glycerides are well known in the food art and are permitted for addition to dairy products. Thus, the skilled artisan will have little difficulty selecting particular commercially available lactylated mono- and di-glyceride blends for use herein. Preferred for use herein are emulsifier blends available under the tradename Lactem P22 from Danisco Cultor in Copenhagen, Denmark due to aerated yogurt end product attributes that are obtained with its usage. Lactem P22 is a lactic ester of mono- and di-glycerides.

The second lactylated emulsifier blend is generally available as a solid powder at room temperature. In preferred embodiments, the second lactylated emulsifier blend is added slowly to the wetting agent—in-hot water dispersion with mild agitation, the combination is then heated to above its melting point. The aqueous mixture so formed is maintained at elevated temperatures and with mild agitation for times sufficient to hydrate fully the second lactylated emulsifier blend to form a hydrated emulsifier blend. Good results are obtained when the hydrated emulsifier blend is maintained at temperatures ranging from above the krafft temperature of the second emulsifier blend to below boiling. In more preferred embodiments, the hydrated emulsifier blend is maintained at temperatures from about 40° C. to 95° C. Depending upon such factors as amount of wetting agent, the particular materials employed as the second emulsifier blend, the temperature at which the hydrated emulsifier blend is maintained, the type and degree of agitation, hydration can be achieved in holding times ranging from 10 minutes to about two hours. As hydration progresses, the hydrated emulsifier blend exhibits an increase in viscosity. Once the hydrate is fully dispersed the viscosity increases as the hydrate is cooled to below the krafft point. The completion of the hydration can be visually determined by observing the formation of a white viscous mass that gradually thickens as it is cooled.

The admixed hydrated emulsifier blend so prepared has a native pH in the range of 6.0 to 6.5. To increase the bacteriological safety and extend the shelf-life of the product, the pH of hydrated emulsifier can be lowered to a range of 4.2 to 4.6 as described further below.

The third essential step comprises at least pasteurization of the hydrated emulsifier. Since it is intended that the hydrated emulsion can be added directly to an already fermented yogurt culture, pasteurization provides bacteriological stability for a blended yogurt/hydrated emulsifier product that does not receive further bacteriological treatment such as heat processing. Also, pasteurization is desirable to allow for production of the hydrated emulsifier blend at one production facility and transportion to a separate yogurt product manufacturing facility with a reduction in the spoilage tendency of the hydrated emulsifier during transport and storage. The hydrated emulsifier blend surprisingly can be packaged and transported from the production facility to a separate yogurt product manufacturing facility in about one metric ton quantities via appropriate aseptic stainless steel containers, commonly referred to as totes. Alternatively, the hydrated emulsifier blend can be packaged and transported in a variety of plastic containers easily identified by one skilled in the art.

In other contemplated uses of the hydrated emulsifier blend, such as the pre-fermentation addition to a pasteurized yogurt milk, pasteurization of the hydrated emulsifier is also desirable. Pasteurization of the hydrated emulsifier prevents the degradation of a pasteurized yogurt milk base when admixed. In addition, pasteurization of the hydrated emulsifier prior to admixture with the yogurt base allows for post-pasteurization addition of the hydrate to the yogurt milk base. Such post-pasteurization addition in turn desirably allows the yogurt milk base to be prepared via or with high temperature, short time (HTST) pasteurization, and the hydrated emulsifier to be prepared via batch pasteurization if desired. The hydrated emulsifier blend pasteurization step is accomplished either through batch pasteurization or high temperature, short time (HTST) pasteurization.

Batch pasteurization is preferred, as the hydrated emulsifier does not develop a high viscosity as a result of this technique. The viscosity of the hydrated emulsifier is dependent in important part on the amount of shear the hydrate undergoes. Batch pasteurized hydrate does not develop a high viscosity, whereas HTST as a result of a high flow of product and pumping can develop a fair amount of shear and a high viscosity. It is more critical to agitate the hydrated emulsifier pasteurized via HTST, in order to control and lower the viscosity, however agitation during cooling is always helpful in controlling the critical viscosity.

Continuous pasteurization of the hydrated emulsion requires the hydrated emulsion be continually agitated during cooling to prevent large increases in viscosity. While not wishing to be bound by the proposed theory, it is speculated herein that the increases in viscosity can be due to the changes in the conformation of the sodium stearyl lactate under shear. Decreasing the quantity of sodium stearyl lactate in the hydrated emulsion can decrease the increase in viscosity in the hydrated emulsion. Continual agitation of sodium stearyl lactate and the hydrated emulsion can line up the crystal structures in a way that is less bulky. Sodium stearyl lactylate can form cylindrical aggregates under shear. Batch pasteurization causes little change in viscosity The hydrated emulsifier can be treated, and in more preferred embodiments, is desirably characterized by higher levels of bacteriological stability than mere pasteurization. Thus, preferred for use herein are hydrated emulsifiers that are aseptic, i.e., having a plate count of less than $10^1$ and thus have a higher level of bacteriological stability than mere pastuerization. Also useful herein are sterile hydrated emulsifier blends characterized by absence of any viable microorganizisms and even viable bacteriological or mold spores, i.e., are even more bacteriologically stable than aseptic products. Conventional thermal processing techniques can be employed to prepare such sterile hydrated emulsions. Other techniques are known such as irradiation, ultra high pressure sterilization, ultrasonic heating, ohlmic heating and the like can also be practiced in full or partial substitution for the preferred heat treatment if and when such techniques become commercially and economically practical.

In the preferred embodiment using heating for bacteriological control, the at least pasteurized hydrated emulsion hydrate is then cooled to a temperature of below its krafft point to form a cooled pasteurized hydrated emulsifier blend. Good results are obtained when the hydrated emulsion is cooled to about 35° C. to 50° C. (about 95° F. to 120° F.), preferably about 40° C. to 48° C. (about 105° F. to 115° F.), most preferably about 41° C. (about 106° F.), and for best results to be below about 37° C. (about 100° F.). The cooling of the hydrated emulsion to a temperature below its krafft point is important establishing the hydrated emulsion into an alpha-gel phase. The aeration functionality of the hydrated emulsion is optimal in the alpha-gel phase.

The cooled pasteurized hydrated emulsion maintains functionality at ambient and refrigerated temperatures, but must be below its krafft point for optimal functionality.

Once the hydrate is in the alpha-gel phase is it also fairly stable over time to changes in pH. The alpha-gel phase is optimal for the hydrate aeration functionality. Manipulations to the hydrate above its krafft point leads to separation of the combined components and lack of functionality. In the event the hydrate is heated above the krafft point, the hydrate viscosity will decrease and the hydrate can degrade or convert to a liquid crystalline form. Cooling can be used in the event the hydrate is heated above the krafft point in order to convert the hydrate back to the functional alpha-gel phase.

The admixed hydrated emulsifier has a native pH in the range of 6.0 to 6.5.

It will be appreciated that without refrigeration, the shelf-life of the hydrated emulsion is only 24 to 36 hours due to microbial issues. Mold and bacterial growth in the hydrate can become an issue without further processing.

One method for extending the shelf-life of the hydrate is to rapidly cool the hydrate to refrigeration temperatures. The viscosity of the hydrated emulsifier must be controlled and lowered to below 40,000 cps during cooling, preferably the viscosity can be lowered to a range from 15,000 cps to 25,000 cps, this can be accomplished with agitation. The hydrated emulsifier must be agitated during cooling in order to make the blend more easily pumpable. If the hydrate is allowed to cool quiescently the viscosity will be higher. The hydrated emulsifier cooled to refrigeration temperatures without gentle agitation is difficult to pump into a yogurt base. Identification of a pump capable of pumping the hydrated emulsifier cooled to refrigeration temperatures without gentle agitation, that additionally has a desirable sanitary design for use with a yogurt base has not been achieved. Thus it is desirable to cool the hydrate blend with gentle agitation in order to lower the viscosity to make it suitable for readily available pumps. While not wishing to be bound by the proposed theory, it is speculated herein that the hydrated emulsifier cooled quiescently has a higher viscosity due to molecule alignment.

Another technique for extending the shelf-life of the hydrated emulsifier blend is to lower its pH from its native pH to the range of 3.7 to 4.7. In preferred embodiments, the hydrated emulsion is essentially characterized by a pH in the range of about 3.7 to 4.7, more preferably about 4.2 to 4.7 to minimize acid shock to the yogurt, and for best results about 4.5. Such low pH hydrated emulsions have a shelf-life of up to 3 months at refrigerated temperatures. The pH can be conveniently lowered by adding an edible acid to the hydrated emulsion such as edible organic acids selected from the group consisting of citric acid, lactic acid, malic acid, succinic acid, tartaric acid, and mixtures thereof. The acid addition can be achieved by several methods, examples of which will be set forth herein in the examples. Preferred for use herein is citric acid for taste and cost considerations. In other variations, buffers systems, e.g., a mixture of citric acid and sodium citrate can be used.

In another variation, the pH of the hydrated emulsifier blend can be lowered to about 4.0 to 4.7 by co-blending the cooled pasteurized hydrated emulsifier blend with an aseptic fruit prep base in a weight ratio of hydrated emulsifier blend to fruit prep base from about 1:1 to about 1.25:1, to form an emulsion bearing fruit prep base. The emulsion bearing fruit prep base can then be added to a yogurt base.

An example of an acceptable fruit base comprises 55% to 75% by weight sucrose, 0.5% to 2% by weight starch, 15% to 35% by weight fruit solids, and the remaining composite containing acid, potassium sorbate, color, and flavors. The absence of any particulates such as fruit seeds or fruit chunks aids in the flowability and pumpability of the product.

In addition to extending the shelf-life of the hydrated emulsion, a low pH is also beneficial to minimizing pH shock upon addition of the hydrated emulsifier to a fermented dairy product. It will be appreciated that most yogurt products including stirred style yogurt have a finished pH below the thickening pH of the milk proteins on the order of 4.2 to 4.7, more preferably 4.5. Addition of an unacidified hydrated emulsifier with a pH in the range of 6.0 to 6.5 can result in a higher pH yogurt product having safety concerns. If the pH of the yogurt product is greater than 4.8, the product exhibits greatly reduced bacteriologically stable. Furthermore, since pH affects the gelling properties of milk proteins and flavor, maintenance of the pH within the recited range allows for addition to the yogurt base without further processing or formulation manipulation.

The hydrated emulsion resulting from the present invention is especially suitable for use in the formation of a refrigerated aerated yogurt. The present hydrated emulsion is superior in that the hydrated emulsion can form large aircells in the cultured yogurt base at a much faster rate in contrast to other emulsions, while providing more shelf-stable aircells.

In addition, in contrast to other emulsions, the improved hydrated emulsion provides a greater increase in viscosity in the cultured yogurt base. The higher viscosity is more desirable as it assists in setting the matrix of the food base faster.

EXAMPLE 1

A hydrated emulsion was prepared having the following composition:

| | | |
|---|---|---|
| A. | Sodium stearyl lactylate | 1%; |
| B. | Lactylated mono- and di-glycerides | 10%; |
| C. | Water | 89%; |
| | | 100%. |

In a preferred embodiment, the sodium stearyl lactylate was added to the hot water. The sodium stearyl lactylate was obtained from American Ingredients in Anaheim, Calif.

The hot water was heated to a temperature of 65° C. prior to admixture with the sodium stearyl lactylate.

The sodium stearyl lactylate and hot water were admixed and gently agitated at 10 rpm for 7 minutes to allow complete mixing. A 10% by weight surfactant of the mono- and di-glyceride lactylate was then admixed with the sodium stearyl lactylate and water mixture, gentle agitation was maintained throughout the method.

In the most preferred embodiment, a surfactant with the tradename Lactem P22 was purchased from Danisco Cultor in Copenhagen, Denmark. Lactem P22 is a lactic ester of mono- and di-glycerides.

Gentle agitation during the process was critical to achieving optimal functionality of the hydrated emulsion. Extended shear or increased agitation during the process results in a high viscosity hydrated emulsion with decreased aeration functionality.

The hydrated emulsion comprising sodium stearyl lactylate, hot water, and Lactem P22 was then held for approximately 5 minutes to allow agitation to assist in intermixing the combined hydrated emulsion.

The combined hydrated emulsion was then pasteurized via high temperature/short time(HTST).

The hydrated emulsion blend was then cooled to below the krafft point.

The pH of the batch pasteurized hydrated emulsion blend was 6.0.

The hydrated emulsion was then immediately admixed with a yogurt base.

EXAMPLE 2

A hydrated emulsion was prepared having the following composition:

| A. | Sodium stearyl lactylate | 1.0%; |
|---|---|---|
| B. | Lactylated mono- and di-glycerides | 10.0%; |
| C. | Water | 88.845%; |
| D. | Sodium benzoate | 0.05%; |
| E. | Citric acid | 0.105%; |
| | | 100%. |

The wetting agent, and sodium benzoate were added to 78.8% by weight of the hot water. The wetting agent, sodium stearyl lactylate was obtained from American Ingredients in Anaheim, Calif. The sodium benzoate was added for preservative purposes.

The water used in the mixture was heated to 65° C. prior to admixture with the sodium stearyl lactylate and sodium benzoate.

The sodium stearyl lactylate, sodium benzoate and hot water mixture were gently agitated for 7 minutes at 10 rpm to allow complete mixing. Lactem P22 was then admixed with the sodium stearyl lactylate, sodium benzoate, water mixture, gentle agitation was maintained throughout the method.

The combined hydrated emulsion was next pasteurized through a batch pasteurization system at 76° C. for 6 minutes. The pH of the batch pasteurized hydrated emulsion Was 6.2.

The hydrated emulsion comprising sodium stearyl lactylate, sodium benzoate, hot water, and Lactem P22 was then cooled to 27° C. while maintaining the agitation.

The hydrated emulsion next was admixed with a mixture comprising 10% by weight of the water and 0.105% citric acid. The citric acid mixture was heated to 77° C. and maintained for 6 minutes prior to cooling to a temperature of 27° C. The hydrated emulsion was then combined with the citric acid mixture in a ratio of 8:1 hydrated emulsion to citric acid mixture.

The pH of the combined hydrated emulsion/citric acid mixture was 4.3. Achieving the desirable pH extends the shelf-life to approximately 3 months.

The product was packaged in plastic containers.

EXAMPLE 3

A hydrated emulsion was prepared having the following composition:

| A. | Sodium stearyl lactylate | 1.0%; |
|---|---|---|
| B. | Lactylated mono- and di-glycerides | 10.0%; |

-continued

| C. | Water | 88.845%; |
|---|---|---|
| D. | Sodium benzoate | 0.05%; |
| E. | Citric acid | 0.105%; |
| | | 100%. |

The sodium stearyl lactylate, and sodium benzoate were added to 78.8% by weight hot water (65° C.). The sodium stearyl lactylate was obtained from American Ingredients in Anaheim, Calif. The sodium benzoate was added for preservative purposes.

The sodium stearyl lactylate, sodium benzoate and hot water were admixed and gently agitated to allow complete mixing. A 10% by weight of Lactem P22 was then admixed with the sodium stearyl lactylate, sodium benzoate, water mixture, gentle agitation was maintained throughout the method.

The combined hydrated emulsion was next pasteurized through a HTST pasteurization system. The pH of the HTST pasteurized hydrated emulsion was in the range of 5.9 to 6.7, more preferably a pH of 6.3.

The hydrated emulsifier comprising sodium stearyl lactylate, sodium benzoate, hot water, and Lactem P22 was then cooled to 27° C. while maintaining the agitation.

The hydrated emulsion was then added to a fruit prep base in order to achieve a pH of 4.3. The preferred ratio of hydrated emulsion to fruit prep base would be 5:4

The fruit base was comprised of 65% by weight sucrose, 1% by weight starch, 25% by weight fruit solids, and the remaining composite containing acid, potassium sorbate, color, and flavors. The fruit base was absent any particulates such as fruit seeds or fruit chunks. The absence of particulates in the fruit base was necessary to ensure pumpability of the product.

The product was then packaged in aseptic stainless steel totes or containers.

What is claimed is:

1. A food product useful in the preparation of an aerated product, comprising:
    a. about 0.5 to 1.5% wetting agent;
    b. about 7 to 15% lactylated mono- and di-glycerides;
    c. an edible organic acid; and,
    d. balance water;
    wherein said food product is pasteurized having a pH of about 3.7 to 4.7.

2. The food product of claim 1 wherein the wetting agent is selected from the group consisting of polysorbates, propylene glycol esters, sodium dodecyl sulphate, sodium stearyl lactylate, and mixtures thereof.

3. The food product of claim 1 wherein the wetting agent is sodium stearyl lactylate.

4. The food product of claim 1 comprising about 0.5% to 0.75% of the wetting agent.

5. The food product of claim 1 comprising about 8 to 12% lactylated mono- and di-glycerides.

6. The food product of claim 1 comprising:
    a. about 0.5 to 0.7% wetting agent;
    b. about 8 to 12% lactylated mono- and di-glycerides; and,
    c. balance water.

7. The food product of claim 1 additionally comprising an anti-molding agent.

8. The food product of claim 7 wherein the anti-mold agent is sodium benzoate.

9. The food product of claim 1 wherein the pH is about 4.3.

10. The food product of claim 1 wherein the temperature of the product is from about 37° C. to about 47° C.

11. The food product of claim 1 wherein the temperature of the product is from about 0° C. to about 37° C.

12. The food product of claim 1 wherein the product pasteurized has a viscosity of 5,000 cps. to 40,000 cps. at a temperature of 1° C. to 7° C.

13. The food product of claim 1 wherein the product pasteurized has a viscosity of 10,000 cps. to 25,000 cps. at a temperature of 1° C. to 7° C.

14. The food product of claim 1 wherein the product is at least pasteurized.

15. The food product of claim 1 wherein the aseptic plate count of the product is less than $10^1$.

16. The food product of claim 1 wherein the product is refrigerated.

17. The food product of claim 1 wherein the product is packaged in an aseptic stainless steel tote.

18. The food product of claim 1 wherein the product is packaged in a plastic container.

* * * * *